United States Patent [19]
Takeuchi et al.

[11] Patent Number: 4,888,648
[45] Date of Patent: Dec. 19, 1989

[54] ELECTRONIC ALBUM

[75] Inventors: Ryozo Takeuchi; Yasuaki Suzuki; Tetsuya Nagata; Eturo Hirose, all of Hitachi, Japan

[73] Assignee: Hitachi, Ltd., Tokyo, Japan

[21] Appl. No.: 127,454

[22] Filed: Dec. 2, 1987

[30] Foreign Application Priority Data

Dec. 5, 1986 [JP] Japan .................. 61-288826

[51] Int. Cl.[4] .............................. H04N 5/85
[52] U.S. Cl. .................... 358/335; 358/906
[58] Field of Search .............. 360/14.1, 14.2, 14.3, 360/33.1, 35.1; 353/310, 311, 335, 342, 906; 364/900

[56] References Cited

U.S. PATENT DOCUMENTS

| | | | |
|---|---|---|---|
| 4,041,463 | 8/1977 | Slutzky et al. | 364/900 |
| 4,130,834 | 12/1978 | Mender et al. | 358/335 |
| 4,262,301 | 4/1981 | Erlichman | 358/906 |
| 4,295,154 | 10/1981 | Hata et al. | 360/33.1 |
| 4,425,586 | 1/1984 | Miller | 358/335 |
| 4,555,803 | 11/1985 | Hirose | 358/335 |
| 4,635,136 | 1/1987 | Ciampa et al. | 360/14.1 |
| 4,660,102 | 4/1987 | Kawakami et al. | 358/906 |
| 4,763,208 | 8/1988 | Kawamura et al. | 360/33.1 |
| 4,769,721 | 9/1988 | Kajiura | 360/14.1 |

FOREIGN PATENT DOCUMENTS 2089169 6/1982 United Kingdom.
2090503 7/1982 United Kingdom.

OTHER PUBLICATIONS

T. Taneka et al., "An Electronic Still Camera System", IEEE Transactions on Consumer Electronics, vol. CE-32, No. 3, Aug. 1986, pp. 345-353.
Y. Hori et al., "Development of High Definition Video Copy Equipment", IEEE Transactions on Consumer Electronics, vol. CE-32, No. 3, Aug. 1986, pp. 283-288.
H. Farhngi et al., "A CD-ROM Data Retriever IC", IEEE Transactions on Consumer Electronics, vol. CE-32, No. 4, Nov. 1986, pp. 769 to 775.

Primary Examiner—Donald McElheny, Jr.
Attorney, Agent, or Firm—Antonelli, Terry & Wands

[57] ABSTRACT

An electronic album to which a recording medium recorded with image information took by an electronic still camera is loaded. The electronic album reads the image information and is used to preserve the image information for a long time. The electronic album has a keyboard for use in adding index information to image information, a printer for printing out an edited/modified image information retrieved by the index information, and a display with a page turn-over function.

11 Claims, 4 Drawing Sheets

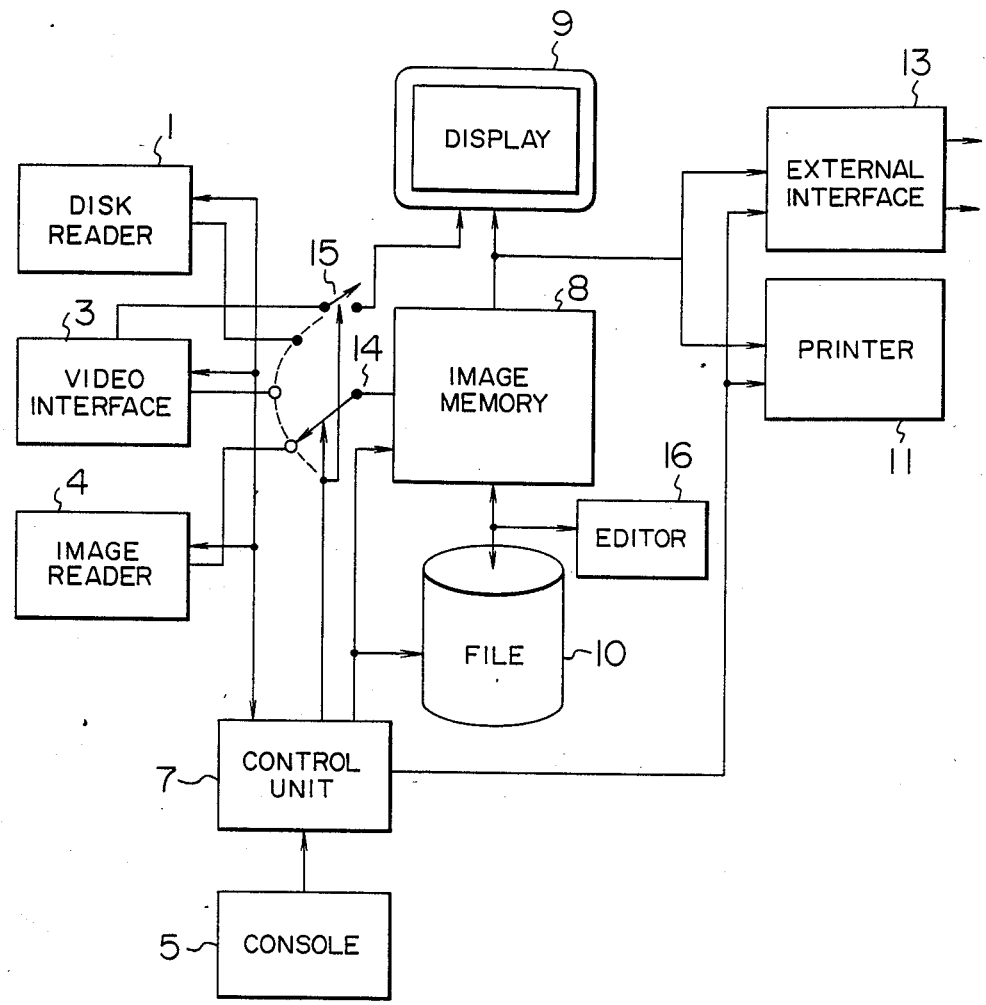

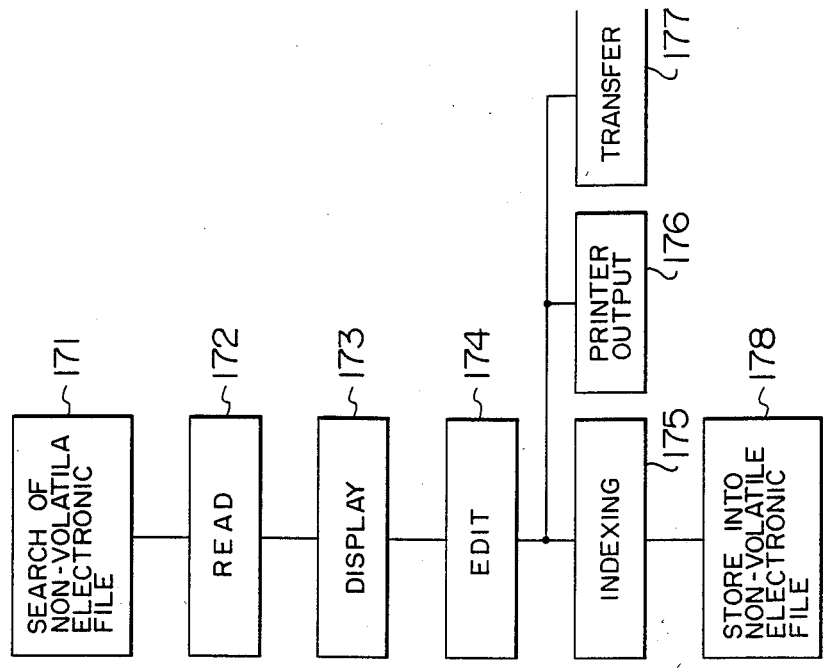
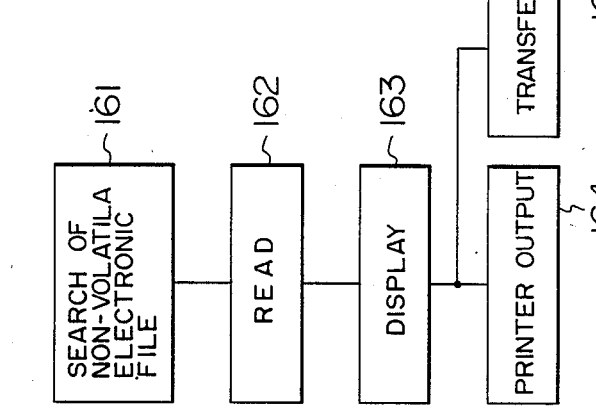
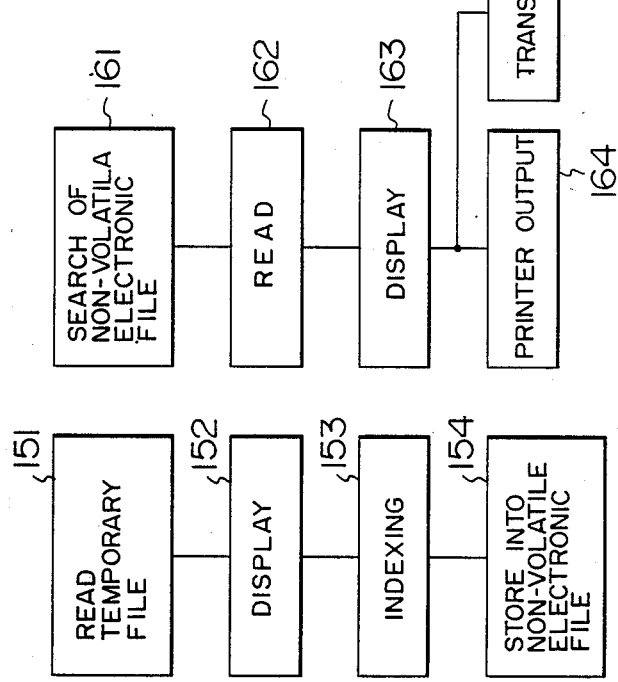

ELECTRONIC ALBUM

BACKGROUND OF THE INVENTION

The present invention relates to an image filing system, and more particularly to an electronic album system suitable for use in filing image information regarding affairs of a family.

A conventional album holds images recorded on a paper. However, image information obtained by an electronic image forming apparatus such as a video apparatus constructed of a video camera, a video tape recorder and the like, an electronic still camera or the like is generally recorded on a recording medium or in some cases may be recorded on a paper. It is ideal if the image information on such a recording medium is converted into and stored as electric signals since they are free from image quality deterioration. Data recorded on a magnetic recording medium mounted within an electronic still camera will suffer a potential lowering of a record level of the data or an instant erasure of the data caused by a magnet or the like. In this case, there arises a problem associated with image retrieval. As an example of a conventional image retrieval, there is described in GB No. 2090503-A and GB No. 2089169-A a system for giving index information using a keyboard mounted on an electronic still camera.

It is important, however, for an electronic still camera to be portable so that such arrangement of inputting index information with a built-in keyboard is not practical. It is desirable for an electronic still camera to have only a mechanism which automatically gives a date of taking a photograph by using a microcomputer.

An electronic still camera is described in "An Electronic Still Camera System" by T. Tanaka et al., IEEE Transactions on Consumer Electronics, Vol. CE-32, August 1986, pp. 345 to 353.

A video copy equipment is described in "Development of High-Definition Video Copy Equipment" by Y. Hori et al., IEEE Transactions on Consumer Electronics, Vol. CE-32, No. 3, August 1986, pp. 283 to 288.

A handling unit for CD-ROM data is described in "A CD-ROM Data Retriever IC" by H. Farhngi et al., IEEE Transactions on Consumer Electronics, Vol. CE-32, No. 4, November 1986, pp. 769 to 775.

SUMMARY OF THE INVENTION

It is an object of the present invention to provide an electronic album system in which a large amount of image information on a family can be stored and from which the image information can be readily retrieved.

It is another object of the present invention to provide an equipment which is used for storing and editing image information recorded on a recording medium with a video apparatus, an electronic still camera or the like, by loading the recording medium to the equipment.

It is a further object of the present invention to provide an electronic album capable of storing a large amount of image information on a family with index information added thereto and readily retrieving image information using the index information.

The above objects are achieved by electrically reading image information from various image recording media, adding index information thereto, and sequentially recording the image information with index into a large capacity image file.

Image information recorded in various image recording media is read with a file reader is added with index information and thereafter, the image information with index is stored in a large capacity image file. Therefore, a large amount of image information on a family can be stored in the image file in unison and the information can be readily retrieved therefrom.

If an optical file is used, ten thousands of ordinary color photographs can be stored in a single optical file, which is sufficient for use by family members.

BRIEF DESCRIPTION OF THE DRAWINGS

FIG. 2 is a block diagram showing the circuit arrangement of the electronic album;

FIG. 3 shows a format of index information;

FIGS. 5A to 5C are flow charts illustrating the operation of adding index information.

DESCRIPTION OF THE PREFERRED EMBODIMENTS

An embodiment of the electronic album according to the present invention will be described with reference to FIGS. 1 and 2.

Figure 1:
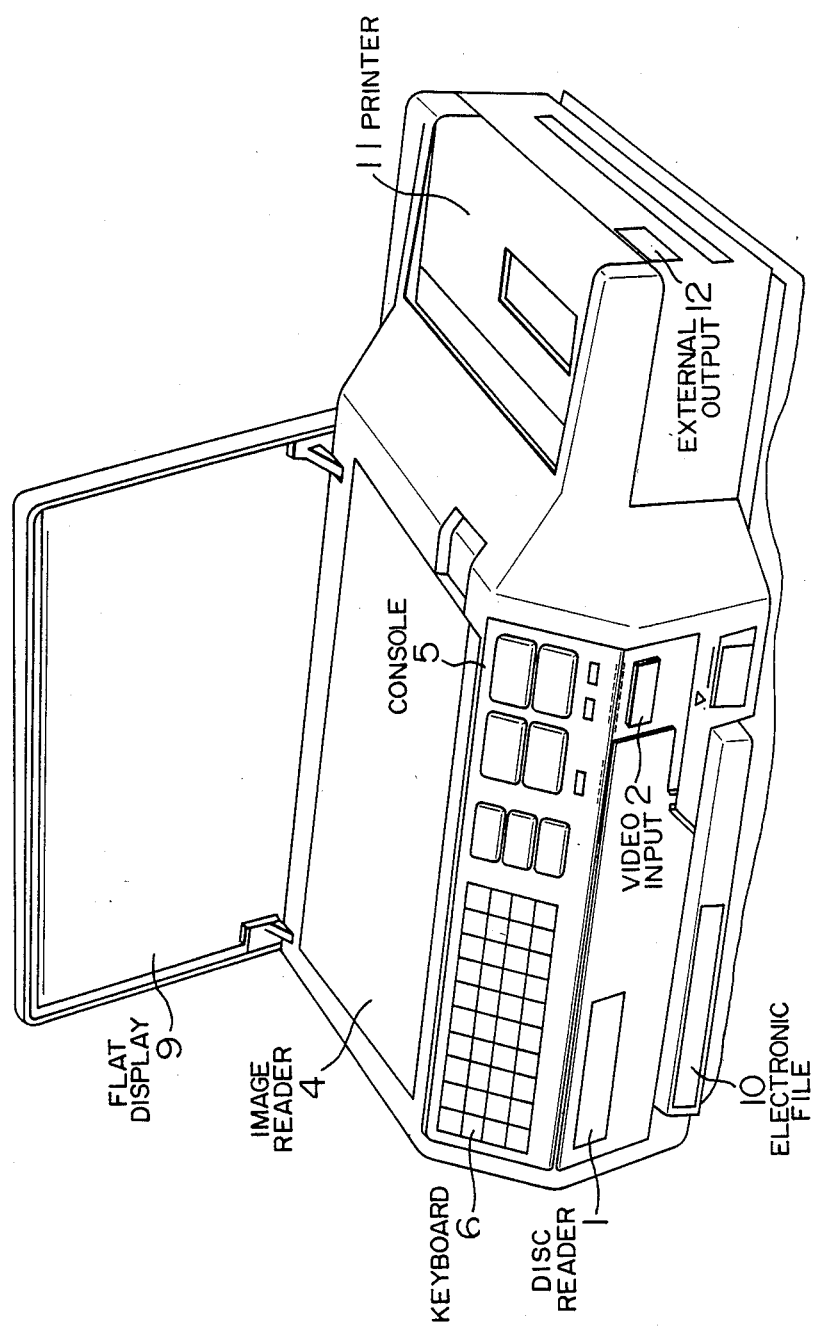
FIG. 1 is a front perspective view of an embodiment of an electronic album according to the present invention.

FIGS. 1 shows an outer appearance of an embodiment of the electronic album, and FIG. 2 is a block diagram showing the circuit arrangement and signal flow of the electronic album shown in FIG. 1.

An image recording medium for an electronic still camera is a magnetic disc about 2 inches in diameter which can record approximately 50 images in the form of analog signal. Image information is read from the image recording medium and converted into digital signals by using file reader means or disc reader 1. The digital signals are stored in an image memory 8 and displayed on a flat display 9 such as a liquid crystal display, an electroluminescent display and an electrochromic display ECD. Index information is then inputted from a keyboard 6 mounted on input means or console 5 to be added to the image information stored in the image memory 8. Image information having index information is sequentially stored in a non-volatile electronic file 10 such as a rewritable or write once type optical disc. Consecutive numbers for example may be used as index information.

An image obtained from, e.g., a video tape recorder, a video disc, a video camera or the like is applied to a video input terminal 2 and to a video interface 3 whereat analog video signals are digitized and stored in the image memory 8 and displayed on the display 9. Video images inputted from the video input terminal 2 are continuously changing in time so that it is difficult to decide at once which scene of the video images to be selected. In view of this, prior to scene selection, a video-through switch 15 is turned on to directly display video images inputted from the video input terminal 2 on the display 9. After scene selection, the video-through switch 15 is turned off while the selected video image in the image memory 8 is displayed on the display 9. Then, index information is inputted from the keyboard 6 mounted on the console 5 and added to the image information in the image memory 8, the image information with index information being sequentially stored in the file 10.

A photograph, picture, document or the like is placed on a glass of an image reader 4 and photoelectrically converted into electric signals to obtain a corresponding image information which is then stored in the image memory 8 and displayed on the display 9. Index information is added to image information, the image information with index information being sequentially stored in the file 10. Different from the case of reading image information with the disc reader 1 or the video interface 3, for the case of reading an image, e.g., a photograph it is necessary to provide information regarding image size, image reading resolution and the like. In case of a home appliance, it is desirable to adopt automatic selection of such information. To this end, sizes to be used frequently such as card, cabinet, A5, B5, A4, B4 and A3 sizes are prepared, one of which is automatically selected using two pairs of optical sensors built in the equipment in the vertical and horizontal directions. The selected size is a minimum size in which an image to be read can be included and a rectangular area except the largest white portion of the image can be included. Selected automatically as an image reading resolution is one of 150 pixels/inch (about 6 pixels/mm), 200 pixels/inch (8 pixels/mm), 300 pixels/inch (12 pixels/mm) 400 pixels/inch (16 pixels/mm) 600 pixels/inch (24 pixels/mm) and 800 pixels/inch (about 32 pixels/mm), these resolutions being prepared taking into consideration the resolutions of the display 9 and the printer 11 and the current technology in this field. Higher resolution is arranged to be automatically selected for a finer image. Further, an image is automatically recognized if it belongs to any one of the image types shown in Table 1, to thereby reduce the image information quantity using a known predictive coding method. The information quantity is indicated in Table 1 using as a reference that of a white/black binary image which is assumed 1. As seen from Table 1, the information quantity of a binary image (with a color or without a color) is minimum.

TABLE 1

| Type of Image | Characteristic | Information Quantity (Bit Ratio) |
| --- | --- | --- |
| White/Black Binary Image | White and Black | 1 |
| White/Black Multi-tonal Image | White, Black and Gray (64 grades) | 6 |
| Color | Combination of (Red, Green and Blue) or (Cyan, Magenta and Yellow) | 3 |
| Color Multi-tonal Image | Combination of other than above three colors | 18 |

The density of a color image is adjusted by a combination of three colors.

As described above, various image informations of a family can be obtained by selecting with a switch 14 a proper image reader section including the disk reader 1, video interface 3 and image reader 4, and the obtained image information is added with index information to be stored in the large capacity file 10.

The image information with index information stored in the large capacity file 10 is used later. As index information for limited use in a family, the date of producing an image and an item associated with the image, i.e., person's name and location are important. Although it is desirable that a correct date is to be used, this relies on a user preference. It is also desirable to employ a variable length index so as to make it possible to use not a single person's name but all the person's names in an image as index information. Further, it is desirable to permit index information to be modified. Illustrated in FIG. 3 is a method of providing index information which considers the above conditions. Image information is stored at the addresses from a start address 33 to an end address 34. In an image type field 35, the classification indicated by Table 1 is recorded. In a year/month/day/time/minute/second field 35, corresponding information is recorded. In an index information field 37, the person's name, location and the like associated with an image are inputted from the keyboard 6. In a next address field 38, the addresses at which index information after modification are recorded while using a non-alterable file. In case of an alterable file, it is not necessary to provide this field. Items in FIG. 3 to be manually inputted from the keyboard are only the information to be stored in the index information field 37, thus resulting in not so complicated operation by the user.

An image is retrieved using the index information including approximate day and time which were inputted as described above. In this case, it is convenient if a consecutive page turn-over mode is provided by which a displayed image corresponding to the index information is changed by another at a constant time interval. Also a photograph album mode may be provided by which two or four images are produced in a single image screen. Image retrieval using both the modes results in high speed operation. An image to be retrieved is formed by an editor 16 and displayed on the display 9. If a desired image is found, a hard copy thereof can be obtained from the printer 11 while displaying it on the display 9. If a desired image is to be displayed on another display or the image information is to be transferred to another equipment, a data format is produced by an external interface 13 and outputted from an external output terminal 15.

Since the editor 16 is provided within the equipment, it is possible to combine images already stored, combine an image with character information inputted from the keyboard, store again the combined image into the file 10, output a hard copy from the printer 11, and so on.

It is more important that the file 10 is of a large capacity than of a high speed. In this respect, a rewritable or write once type optical disc is preferable from the standpoint of both the information preservation and capacity. A recording file such as a magnetic disc can also be used while sufficing the objects of the present invention on condition that it employs vertical magnetic recording and undergoes a periodical refresh.

Figure 4:
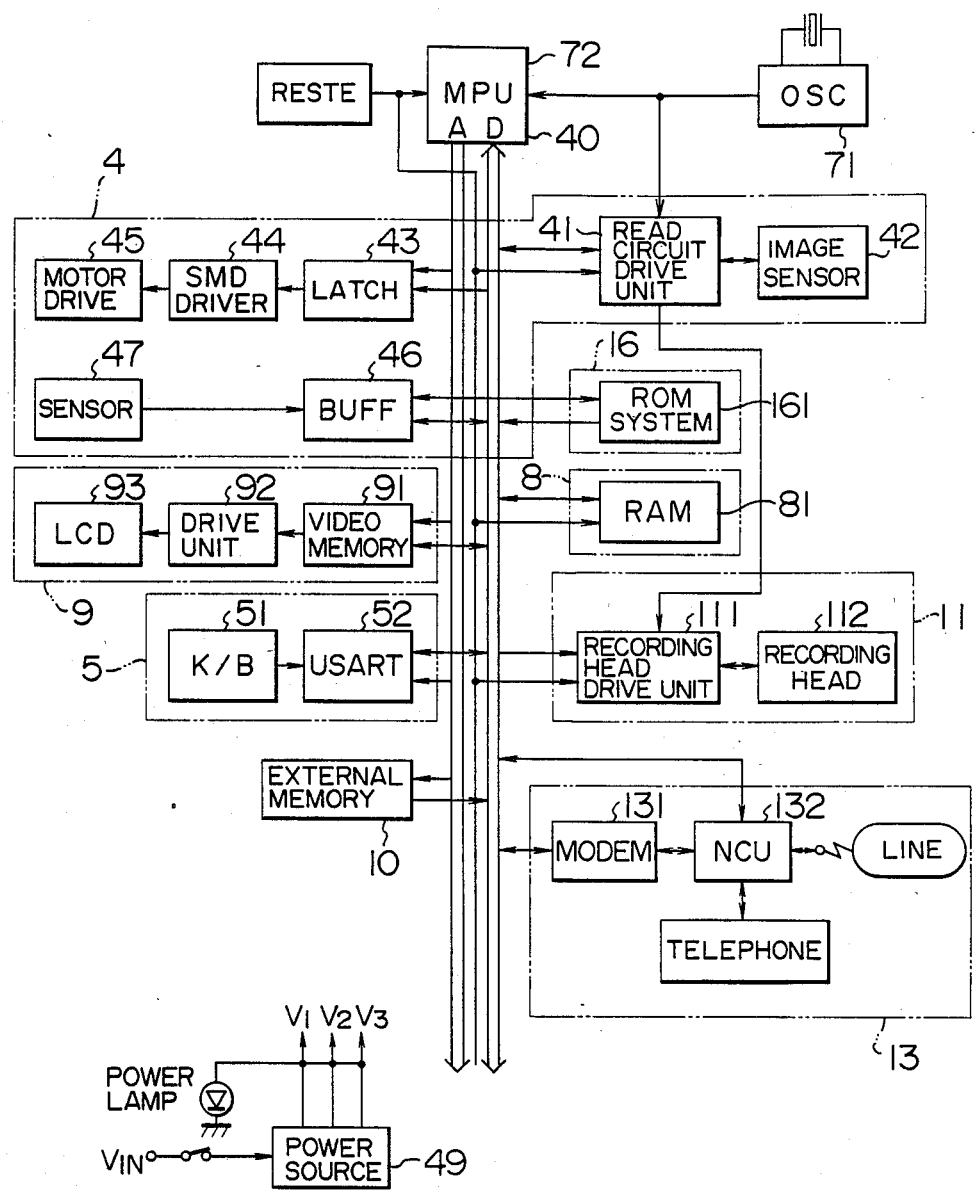
FIG. 4 is a detailed block diagram showing the circuit arrangement of the electronic album.

The outline of an electric circuit of the electronic album of this invention is shown in FIG. 4. After a power is turned on, initial resets are performed and an operation by the user is waited for. An input signal from the disc reader 1 or the video interface 3 shown in FIG. 2 is fetched into an external memory 10 shown in FIG. 4. The image reader 4 shown in FIG. 2 is constructed of a reader circuit drive unit 41, an image sensor 42, a latch 43, a stepping motor driver (SMD) 44, a motor drive 45, a buffer (BUFF) 46 and a sensor 47, respectively shown in FIG. 4. Read-out image information is processed by a microporcessor (MPU) 40. The console 5 shown in FIG. 2 is constructed of a keyboard (K/B) 51 and a universal synchronous/asynchronous receiver transmitter (USART) 52, respectively shown in FIG. 4. The display 9 shown in FIG. 2 is constructed of a video memory 91, a drive unit 92 and a liquid crystal display (LCD) 93, respectively shown in FIG. 4. The printer 11 shown in FIG. 2 is constructed of a recording head drive unit 111 and a recording head 112. The external interface 13 shown in FIG. 2 has a modem (MODEM) and a network control unit (NCU) 132. The image memory 8 shown in FIG. 2 has a random access memory (RAM) 81. The control unit 7 and the editor 16 shown in FIG. 2 are constructed of an oscillator (OSC) 71, a microprocessor (MPU) 72 and a read-only memory (ROM) system 161.

FIGS. 5A to 5C illustrate the operation of programs which run on the ROM system 161 and the MPU 72 of the electronic album equipment shown in FIG. 4 and enable to control the recording head 112 of the printer 11, the external memory 10 and the image reader 4, respectively connected to the electronic album equipment.

At indexing blocks 153 and 175, added to image information are person's name, location and date associated with an image, which information is utilized for discrimination of a particular image.

What is claimed is:

1. An electronic album unit for storing in non-volatile electronic file means image information obtained from various image recording mediums, said electronic album unit comprising:
   file reader means for reading image information recorded on a recording medium by an electronic still camera and outputting said image information;
   video input means for receiving image information from a video equipment and outputting said image information;
   switch means connected to outputs of said file reader means and said video input means for selecting between said image information output by said file reader means or image information output by said video input means and for outputting selected image information;
   editor means for adding index information to said selected image information;
   input means for manually inputting by an operator at least a fraction of said index information;
   non-volatile electronic file means connected to an output of said switch means, said editor means and said input means for sequentially storing said selected image information with said index information added thereto by said editor means and input by said input means and for retrieving said stored information in accordance with said index information;
   image output means connected to said output of said switch means and to said non-volatile electronic file means for outputting said selected image information and/or said retrieved image information; and
   control means, connected to said file reader means, said video input means, said switch means, said editor means, said input means and said non-volatile electronic file means for controlling operation of said unit.

2. An electronic album system according to claim 1, wherein said image output means includes a video signal output terminal.

3. An electronic album system according to claim 1, wherein said image output means includes a display.

4. An electronic album system according to claim 1, wherein said image output means includes a printer.

5. An electronic album system according to claim 1, wherein said editor means has a function of combining images and combining an image and characters.

6. An electronic album system according to claim 1, wherein said non-volatile electronic file means is a re-writable or write once type optical disc.

7. An electronic album unit wherein a recording medium recorded with image information taken by an electronic still camera is loaded to the electronic album unit to read the image information from the medium and store the image information in a disc file, said electronic album comprising:
   (a) video input means, to which said recording medium is loaded, for fetching said image information recorded on said recording medium;
   (b) editor means for adding index information to said fetched image information, said index information discriminating particular image information from other image information;
   (c) non-volatile disc file means, connected to said video input means and said editor means, for storing said image information with said index information;
   (d) image memory means connected to said non-volatile disc file means and constructed of a random access memory for reading said image information designated by said index information from said disc file means and storing said read-out image information; and
   (e) said editor means including means for adding further index information to said image information stored in said image memory means or reducing index information from said image information stored in said image memory means, and thereafter again storing said image information with said additional index information or with said reduced index information, into said disc file means.

8. An electronic album according to claim 7, wherein said editor means further comprises means for adding to said image information a location at which said electronic camera recorded said image information and an objective name associated with said image recorded.

9. An electronic album according to claim 8 further comprising:
   color print means for color printing said image information on a photographic paper.

10. An electronic album according to claim 9 further comprising:
    display means for displaying said image information, said display means including means for reducing a size of images of a plurality of said image information and displaying said images on said display means at a same time, and consecutively turning over a page of a set of said images of said plurality of image information.

11. A method for storing image information in a non-volatile electronic file means of an electronic album system wherein said image information is obtained from various image recording mediums, said method comprising the steps:
    reading, by file reader means, image information recorded on a recording medium by an electronic still camera;
    receiving, by video input means, image information from video equipment;

selecting, by switch means, between said image information reading from said recorded medium as recorded by an electronic still camera and said image information received from said video equipment by said video input means;

adding, by editor means, index information to said selected image information;

manually inputting by an operator at least a fraction of said index information;

sequentially storing, in non-volatile electronic file means, said selected image information with said index information added thereto and retrieving said stored image information in accordance with said index information;

outputting, image output means, said selected image information add/or said retrieved image information; and controlling said unit by control means.

* * * * *